(12) United States Patent
Van Woudenberg

(10) Patent No.: US 7,027,383 B2
(45) Date of Patent: Apr. 11, 2006

(54) OPTICAL DATA STORAGE MEDIUM AND METHODS FOR READING AND WRITING SUCH A MEDIUM

(75) Inventor: Roel Van Woudenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 425 days.

(21) Appl. No.: 10/234,786

(22) Filed: Sep. 4, 2002

(65) Prior Publication Data

US 2003/0048709 A1   Mar. 13, 2003

(30) Foreign Application Priority Data

Sep. 5, 2001   (EP) .................................. 01203348

(51) Int. Cl.
*G11B 7/00*   (2006.01)
(52) U.S. Cl. ................................. 369/275.3; 369/47.22
(58) Field of Classification Search ............ 369/47.22, 369/47.27, 53.21, 275.3, 47.28
See application file for complete search history.

(56) References Cited

U.S. PATENT DOCUMENTS 6,584,046 B1 *   6/2003   Oshima et al. .......... 369/13.31
6,728,181 B1 *   4/2004   Shimoda et al. ........... 369/53.2

\* cited by examiner

*Primary Examiner*—Nabil Hindi
(74) *Attorney, Agent, or Firm*—Michael E. Belk

(57) ABSTRACT

An optical data storage medium (1) is described. The medium (1) has an optically readable information layer with a first optical reflectivity. An annular zone (12), outside the user data recording area (2) has at least one first type (5) of sector provided with a permanent information mark (7), having a second optical reflectivity. The zone has at least one second type (6) of sector provided with a recordable identification mark (8), having a third optical reflectivity different from the first optical reflectivity. Thus, a hybrid bar code like structure, with both permanent and recordable information requiring little radial space, is provided. Further, methods to read such permanent information marks (7)/recordable identification marks (8) and to write such recordable identifications marks (8) are disclosed.

10 Claims, 2 Drawing Sheets

OPTICAL DATA STORAGE MEDIUM AND METHODS FOR READING AND WRITING SUCH A MEDIUM

Figure 1:
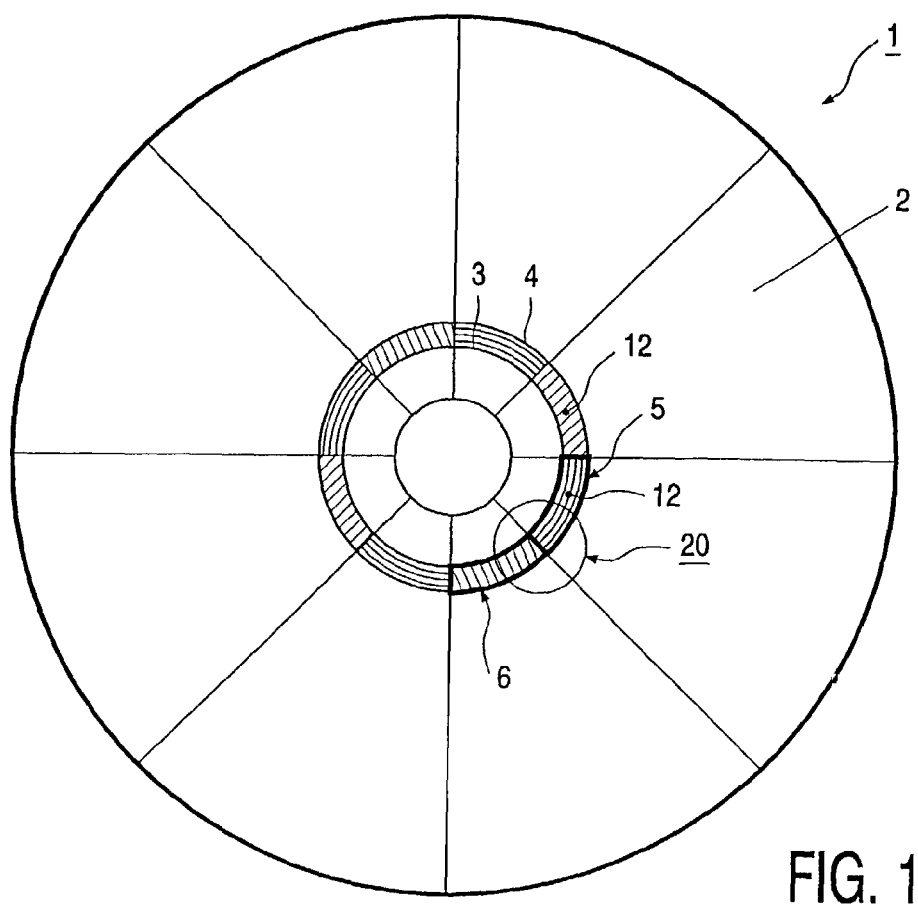

The invention relates to an optical data storage medium, having an optically readable information layer, with a first optical reflectivity, said layer having an annular zone, with an inner periphery and an outer periphery, outside the user data recording area, said annular zone having at least one first type of sector provided with a permanent information mark, having a second optical reflectivity different from the first optical reflectivity.

The invention further relates to a method of reading the permanent information mark and recordable identification mark from such an optical data storage medium and a method of writing a recordable identification mark onto such an optical data storage medium.

An embodiment of an optical data storage medium of the type mentioned in the opening paragraph is known from U.S. Pat. No. 5,671,202. The embodiment described in this patent application is an optical disk that has optically readable patterns in the reflective layer outside the user data area. The patterns are readable with the naked eye or by machine and may serve as a permanent information mark.

Optical data storage, and particularly rewritable and write once recording in optical recording disks, is currently finding increasing use in the high-density storage of large quantities of data. Data storage, in this context, includes digital video-, digital audio- and software-data storage. In the optical recording medium, the information is retrieved through the interaction of a radiation beam, e.g. a focused laser beam, with the optical recording medium. A recent type of optical storage medium has the capability to have information recorded on the medium after its manufacture. Another type, in addition, has the capability to have this information erased or modified. These types are generally referred to as write once/recordable, erasable or rewritable optical storage disks. Examples are Compact Disk (CD)-recordable (R), CD-rewritable (RW), Digital Versatile Disk (DVD)-R, DVD–RW, DVD+RW, DVD-random access memory (RAM), and Digital Video Recording (DVR)-red and blue disk, where red and blue refer to the wavelength of the radiation beam, e.g. recording and reading laser beam.

The rewritable or recordable optical recording disk has a recording stack of layers comprising a recording/information layer that is responsive to radiation having a relatively high power level. The impinging radiation changes properties of the recording layer of the recording stack. The total recording stack has an optical reflectivity and may be seen as a reflective layer. The property changes of the recording layer result in reflectivity changes of the recording stack and are detected optically through the interaction with an impinging radiation beam of relatively low power level. Thus, the data encoded by means of the property changes can be recovered. For example intensity, phase or polarization changes of the reflected radiation may be detected by a photo diode and converted into electrical signals. The electrical signals are subsequently converted to a format, which can be conveniently manipulated by a signal processing system.

In order to provide basic disk information, such as, e.g. a specification of the disk type, manufacturer, the track pitch of the disk and the wavelength needed for reading or writing, a permanent information mark may be present on the optical data storage medium. The permanent information mark is present in an annular zone defined by an inner and outer periphery. Such a permanent information mark may e.g. be a so-called Phase Encoded Part (PEP), consisting of a bar code written during manufacture of the master disk of the optical data storage medium. Such a master disk is used to manufacture a so-called stamper, which is used to press optical disk substrates containing permanent information in the form of pits or guiding tracks. The bar code comprises patterns of embossed pits formatted such that the information can be read without radial tracking, and a reduced density may be used such that it can be read with an additional simple bar code reader in the optical disk drive, e.g. a simple LED combined with a detector, in stead of the objective lens in the optical pick-up unit (OPU) of the optical disk drive. In the DVR format both types of reading are possible. The PEP consist of 1 revolution of the bar code like structure which is repeated several tracks, e.g. a radial zone of 0.7 mm. The PEP method is also used in ISO-Magneto Optical (ISOMO) disks according to international standards ISO/IEC 10089 (1991) and 10090 (1992).

In order to provide copy protection security for the data stored on a storage medium, a need has been felt for a technique for providing an optical storage medium which has a unique recordable identification mark. This recordable identification mark is applied to each individual storage medium, e.g. optical disk, and is different for each of them. Therefore this type of recordable identification mark can not be applied during manufacture of the master disk for the optical disk, as this would imply that every optical disk would have the same identification mark.

The recordable identification mark may, for example, be a bar code, representing a serial number, which is written into the write-once or erasable recording layer of the optical disk. During recording of copy-protected content, the user data, i.e. audio/video/files, is encrypted with a key that is based on this recordable identification mark. Examples are copy protection for recordable media (CPRM) for DVD–RAM and other, e.g. newer generation, rewritable formats. During copying of the encrypted user data, which are present in the user data recording area, the recordable identification mark of the original can not be copied to the target medium, because the hardware of the drive of the target medium is not designed for erasing the identification mark of the target medium and copying/writing the identification mark of the source medium. As said, the empty target medium has another recordable identification mark, which already was applied to it during its manufacture. A player that reads the cloned medium is not able to construct the correct original decryption key, since it is necessarily based on the recordable identification mark of the clone, which is not the correct recordable identification mark belonging to the copied content. This prevents so-called bit copying or cloning of the disk. In order to place the correct recordable identification mark of the original disk, a hacker first has to erase the recordable identification mark of the empty disk and subsequently to write a recordable identification mark that corresponds to the encrypted data.

This kind of recordable identification mark is known under the name of Narrow Burst Cutting Area (NBCA), which is feasible for CD–RW, DVD–RW, DVD+RW, DVD–RAM and DVR red or blue. This NBCA covers a predetermined annular zone, e.g. from radius 22.7 to 23.5 mm, and is an improvement of an earlier type of recordable identification mark known as Burst Cutting Area (BCA), which required an even larger radial zone.

The recording layer may be an amorphous/crystalline type recording layer, which is of the erasable type. This so-called phase change recording layer may be applied by vapor depositing or sputtering. The recording layer thus deposited is amorphous and exhibits a low reflection. In order to obtain a suitable recording layer having a high reflection, the data recording area of this layer must first be completely crystallized, which is commonly referred to as initialization, and which takes place in the final phase in production of each medium. This is performed in a production apparatus called an initializer, in which a laser beam scans and heats the moving recording layer to a temperature below its melting temperature but above its recrystallization temperature, causing the amorphous recording layer to crystallize. This production apparatus crystallizes a path that has a radial width of many tracks of the tracking structure. The whole data recording area must be crystallized which is accomplished by moving the initializer beam in radial direction while rotating the medium. However, at the inner and the outer regions of the disk, e.g. for DVD+RW within a radius of 23.5 mm and beyond a radius of 58.5 mm, the disk may be partially crystallized by using a pulsed laser beam in the initializer. So a recordable identification mark, e.g. bar code pattern, may be written outside the data recording area. By starting the pulse sequence locked to the revolution of the disk and rotating the disk in constant angular velocity (CAV) mode, the recordable identification mark is written on the disk. Production costs are negligibly small, because the recordable identification mark is written during initialization and adds only a few percent of time to only this process step. When using a phase change recording layer the recordable identification mark is, in principle, erasable because it is written using the same or the inverse property change of the recording layer as is used for erasable user data recording.

The optical quality and the uniformity of the layers of the disk within 23.5 mm and beyond 58.5 mm is generally worse than in the data recording area. Therefore, it is preferred to use a relatively low bit-density pattern, compared to the user data, in order to have reliable detection.

Generally the initialization laser beam is rectangle-shaped and measures approximately 1 micrometer in tangential direction and 100 micrometers in radial direction. Writing a recordable identification mark has been demonstrated for DVD−RW and DVD+RW. Since writing a recordable identification mark is part of the already required initialization step, it is an attractive and economic method.

A disadvantage of both the ISO-MO type PEP bar codes and the DVD-NBCA-type bar codes is that they both require a relatively large radial area or zone of the disk. This is because the bar code has to be read-out without tracking, thus its radial width should be sufficiently wide to accommodate for, e.g. the disk eccentricity when the disk is read in the optical disk drive and furthermore because the bar code needs to have sufficient radial margin in case of NBCA-type, since the initializer or other type of NBCA-type writer needs margin to accommodate for eccentricity, typically in the order of 0.05–0.1 mm, when writing the bar code. The first condition implies that the width of the zone should be at least 0.3–0.5 mm; the second condition implies that a margin of 0.1–0.2 mm is required at the start and the stop position and that the initializer written bar code is allowed to have a relative eccentricity with respect to the tracks which have been written during mastering, e.g. pregrooves and PEP embossed information.

It is a disadvantage of the known data storage medium that addition of a recordable identification mark to the permanent information mark requires a minimal extra radial space of at least about 0.7 mm, unavoidably decreasing the available user data storage space by the same amount.

It is therefore an object of the present invention to provide an optical data storage medium of the kind described in the opening paragraph, in which a permanent information mark and a recordable identification mark are present on the same medium, without using additional radial space.

This object is achieved in that the annular zone has at least one second type of sector provided with a recordable identification mark, having a third optical reflectivity different from the first optical reflectivity. There is no extra radial space required to write the recordable identification mark because the annular zone, which is already used for the permanent information mark, is used again for writing a recordable identification mark. In this way a hybrid zone is created containing a mixture of permanent information marks and recordable identification marks.

In a preferred embodiment the first type and second type of sectors form an alternating sequence in tangential direction. Every "even" sector is of the permanent type, e.g. embossed, while every "odd" sector is of the recordable type, i.e. using a write once or erasable reflective recording layer. This allows the least rotational latency to read the information from both types of sectors. In other words the information from both sectors is read immediately after each other and quickly available for processing.

Figure 3:
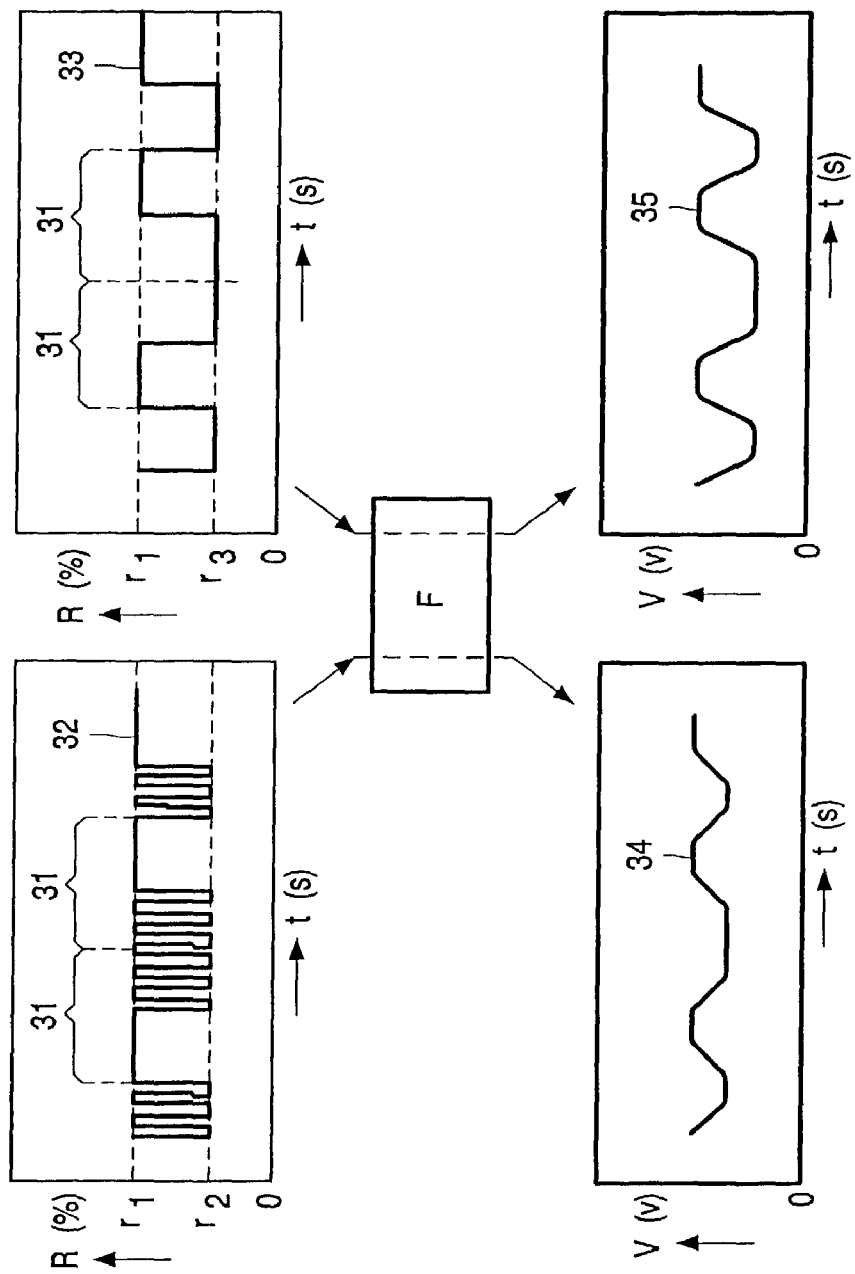

In another embodiment the recordable identification mark has a physical format and a spatial bit-cell density, which are substantially equal to the physical format and the spatial bit-cell density of the permanent information mark. A bit-cell is defined as the length of a sequence of a piece of reflective layer and a series of embossed pits in case of the permanent information mark, or the minimal length of a sequence of a piece of reflective layer and a recordable continuous mark in case of the recordable identification mark. The length is measured in the direction of the scanning spot of a focused radiation beam, which is used for reading out the permanent information mark and the recordable identification mark. The length of the bit-cell, in the time domain, is indicated in FIG. 3 with reference numeral 31. In other words, it is the length of the smallest "light" and "dark" area of the bar code.

The physical format is the structure of data, i.e. permanent information mark and recordable identification mark data, on the disk including the channel code and error correction code (ECC). An example of such a structure of data on the disk is: PreAmble+Sync+data (encoded using channel code, part of ECC)+PostAmble, where PreAmble=Gap+VFO; PostAmble=predetermined set of bits to end sequence correctly, where VFO=regular pattern allowing the phase locked loop (PLL) and its slicer, (which perform the timing recovery, which is used in the bit detection) to settle. The function of the gap will be disclosed later according to another aspect of the present invention. Thus, the same timing recovery (PLL+slicer+optionally equalizer), channel decoder and ECC decoder for both types of data are possible.

In this way the information in both types of sectors can be detected with the same data detection circuitry after e.g. low-pass filtering of the signals from the first and second type sectors. The distances of the flanks, which determine the bit-cells, are substantially equal and are recognized for both the recordable identification mark and the permanent information marks without the need for different logical decoding circuitry. Therefore the bit-cell lengths, which determine the spatial bit density, are substantially equal. The physical format, which is detected, is substantially equal. On micro-scale the physical appearance of the recordable identification marks may differ from the physical appearance of the permanent information marks but a filter in the read-out system may compensate for this difference.

In yet another embodiment four first type and four second type sectors are present. In this way eight sectors are present in the zone. This corresponds to the number of sectors present in the user data recording area of the present DVR disk. This allows the use of the same timing signals as used in the sectors of the DVR data area for read-out of the sectors in the zone. Furthermore, the four times redundancy of the marks allows for a re-read in case one of the sectors is damaged and data cannot be read from that specific sector.

Preferably, the permanent information marks and the recordable identification marks comprise marks that are of the bar-code type. This modulation scheme has proven its robustness and is relatively easy to implement.

In a preferred embodiment the permanent information mark comprises pluralities of pits in the reflective layer forming substantially an optical phase structure, having said second optical reflectivity. The permanent information marks in the sectors of the first type are, e.g., of the ISO-MO embossed type, thus equal for all disks from a single master, i.e. from a single batch.

The information layer comprises an alloy of metals being able to switch between a crystalline and an amorphous state, one state having said third optical reflectivity and the other state having the first optical reflectivity and that the recordable identification mark comprises areas having said third optical reflectivity. Suitable alloys comprise two or more of the metals Al, Ge, Sb, Te, Tb, Sb, In, Ag, Au, Cr, Cu e.g. AgInSbTe, GeInSbTe, $Ge_2Sb_2Te_5$. These alloys allow the writing of the NBCA amorphous-crystalline (A/C) type of marks and are used to, e.g., keep a unique disk number of typically 128, 256 or 512 bits. Preferably the recordable identification mark represents information linked to the user data content of the optical data storage medium. As explained in the introductory part this may provide a secure way of copy protection of the data present in the user data area of the medium.

According to a second aspect of the invention the annular zone of the optical storage medium described in the opening paragraph does not contain a recordable identification mark but only has space reserved and prepared for the placement of at least one second type of sector suitable for the recording of an identification mark, having a third optical reflectivity different from the first optical reflectivity. In this case the optical storage medium is specially prepared for receiving a recordable identification mark according to the invention. In some cases it may be necessary to record the identification mark at a moment in time different from the moment of production of the medium, e.g. after its sale. This type of optical storage medium is explicitly included in the scope of the invention.

The invention further relates to a method of reading the permanent information mark and recordable identification mark from an optical data storage medium according to the invention, comprising scanning the annular zone, with a focused radiation beam at a scanning velocity, intercepting the reflected light from the focused radiation beam with an optical detector, detecting reflection differences between the first optical reflectivity and the second optical reflectivity of the permanent information mark and converting these reflectivity differences into a first alternating electrical signal, detecting reflection differences between the first optical reflectivity and the third optical reflectivity of the recordable identification mark and converting these reflectivity differences into a second alternating electrical signal.

It is a further object of the invention to provide such a method, which is suitable for reading, said permanent information and recordable identification mark with substantially the same detection system for both the permanent information mark and the recordable identification mark.

This object is achieved in that the first and second alternating electrical signals are filtered with a low pass band filter with a cut-off frequency in $s^{-1}$, which is lower than the arithmetical product of the spatial frequency of the pits of the permanent information mark in $m^{-1}$ and the scanning velocity of the focused radiation beam in $ms^{-1}$. The embossed permanent information mark generally comprises series of pits with lengths of different sizes. As discussed earlier one bit-cell of information generally is represented by a minimal series of pits with relatively high spatial frequency combined with a blank area with the same length as the series of pits. This is the so-called PEP format. The series of pits are radially aligned, meaning that every series is repeated radially outward having the same tangential positions. This allows information recovery from this band or zone without radial tracking established by the optical drive. A PEP bit-cell is recorded by writing pits, during the mastering process, in either the first or the second half of the bit-cell. E.g., a logical zero PEP bit may be represented by pits recorded in the first half of the PEP bit-cell and no pits in the second half of the PEP bit-cell and a logical one PEP bit may be represented by pits recorded in the second half of the PEP bit-cell and no pits in the first half of the PEP bit-cell. So multiple pits are used to represent one bit. The read-out signal of such a permanent information mark, i.e. the first alternating electrical signal, has a relatively high frequency because the read-out spot scans the series of pits combined with the fact that it furthermore slightly scans the tracks in radial direction because of the generally present eccentricity, e.g. 50–100 μm, of the optical medium during rotation in the optical drive.

The recordable identification mark may be written in an information layer that comprises an alloy of metals being able to switch between a crystalline and an amorphous state, one state having said third optical reflectivity and the other state having the first optical reflectivity. This is also called a phase change recording layer. The recordable identification mark comprises areas having said third optical reflectivity. These areas of the recordable identification mark are corresponding to the series of pits in the permanent information mark with the exception that they are continuous. So, when using the same PEP format, half a PEP bit-cell may have the first optical reflection and the other half may have the third optical reflection. Furthermore the area with said third optical reflection may be continuously written in radial direction, i.e. no tracks are present. Therefore, when reading out such a recordable identification mark with the OPU read-out optics of the optical drive, the read-out signal, i.e. the second alternating electrical signal, has a relatively low frequency compared to the read-out signal of the permanent information mark. By filtering both the first electrical signal and the second electrical signal with a low pass filter with the proposed appropriate cut-off frequency the resulting filtered signal will have substantially the same shape in the time domain. However, the amplitude may be different, see FIG. 3 graph 34 and 35.

In a special embodiment the focused radiation beam is generated by a light emitting diode (LED), said focused radiation beam having a read-out spot diameter substantially larger than the pit size of the pits of the permanent information mark and wherein the electrical low pass band filter is omitted. When a separate LED information/recordable identification mark read-out apparatus is used, as described previously, the electrical filtering of the read-out signal may be skipped. This is because the LED apparatus has a relatively large optical read-out spot, which is not able to distinguish the small pits in the permanent information mark separately. The filtering is performed optically by the modulation transfer function (MTF) of the LED optical read-out apparatus.

The invention further relates to a method of writing a recordable identification mark onto an optical data storage medium according to the invention, comprising scanning the annular zone, with a focused radiation beam, intercepting the reflected light from the focused radiation beam with an optical detector, detecting reflection differences between the first optical reflectivity and the second optical reflectivity of the permanent information mark and converting these reflectivity differences into a first alternating electrical signal, determining the tangential position of the permanent information marks from the first alternating electrical signal.

It is a further object of the invention to provide such a method which is suitable for writing said recordable identification mark as closely as possible to said permanent information mark without causing interference between said permanent information mark and recordable identification mark.

This object is achieved in that at least one recordable identification mark is written, which does not overlap in tangential direction with any of the permanent information marks by using the tangential position of the permanent information marks as a reference, leaving a first gap between the beginning of the recordable identification mark and the end of the permanent information mark and leaving a second gap between the end of the recordable identification mark and the beginning of the subsequent permanent information mark where the gaps are sufficiently large to accommodate for the tangential alignment tolerance that can be obtained by the writing system of the recordable identification mark. Contrary to the embossed PEP permanent information marks, which are substantially perfectly positioned by the very tight tolerances during the mastering process, the recorded PEP identification marks will inevitably have a writing error in tangential position because the writing system, e.g. an initializer or an optical drive, has less tight tolerances. There may be sector to sector or disk to disk differences. In order to prevent overlap, and thus interference between the recordable identification marks and permanent information marks, the gaps are introduced.

An embodiment of the data storage medium according to the invention will be described with reference to the drawings. It should be noted that drawings are schematic and not to scale.

In the drawings:

FIG. 1 schematically shows a top view of an embodiment of the data storage medium according to the invention.

Figure 2:
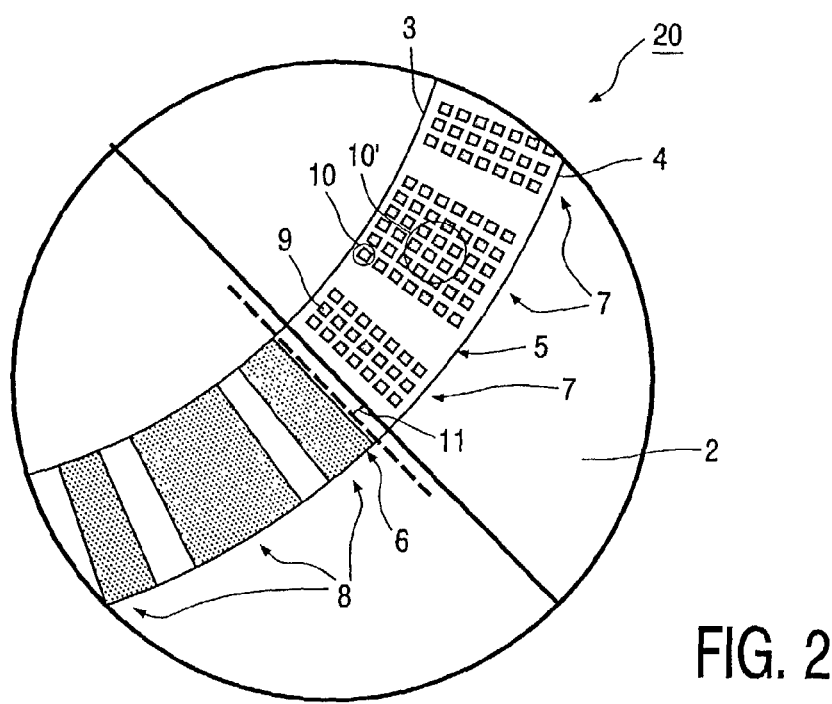

FIG. 2 shows a close up of a section of the data storage medium of FIG. 1.

FIG. 3 schematically shows a read-out signal of a portion of a permanent information mark, a portion of a recordable identification mark containing the same bit values and both these signals after filtering with filter F.

In FIG. 1 the optical data storage medium 1 is shown. The medium 1 has an optically readable reflective layer, with an optical reflectivity $r_1$. The layer has an annular zone 12, with an inner periphery 3 and an outer periphery 4, outside the user data recording area 2. Inner periphery 3 has a radius of 22.0 mm and outer periphery 4 has a radius of 22.7 mm. In FIG. 2 a close up of area 20 is shown. The annular zone 12 has a first type 5 of sectors provided with a permanent information mark 7, which has an optical reflectivity $r_2$ different from $r_1$. The permanent information mark 7 comprises pluralities of pits 9 in the reflective layer forming substantially an optical phase structure. The zone has a second type 6 of sectors provided with a recordable identification mark 8, having a third optical reflectivity $r_3$ different from the first optical reflectivity. Two differently sized read-out spots 10 and 10' of a focused radiation beam are shown. The permanent information marks 7 and the recordable identification marks 8 are of the bar-code type. The first type sectors 5 and second type sectors 6 form an alternating sequence in tangential direction. There are four first type 5 and four second type 6 sectors.

The recordable identification mark 8 has a physical format and spatial bit-cell 31 density, which are substantially equal to the physical format and spatial bit-cell 31 density of the permanent information mark 7.

The information layer of the optical data storage medium is made of the material $Ge_2Sb_2Te_5$. This is an alloy of metals being able to switch between a crystalline and an amorphous state, one state having the third optical reflectivity $r_3$ and the other state having the first optical reflectivity $r_1$. In FIG. 2 the recordable identification mark 8 comprises areas having the third optical reflectivity $r_3$, which in this case corresponds to the reflectivity of the amorphous state of the reflection layer. Thus, the recordable identification marks 8 are substantially amplitude marks, i.e. in the areas with the third optical reflectivity $r_3$ mainly the amplitude of the reflected light is changed as opposed to the reflected light in the permanent information marks 7, where the reflected light from the bottom of the pits 9 is out of phase with the reflected light of the edges of the pits 9, resulting in destructive interference of the light. The read-out signal of the recordable identification mark 8 is schematically shown in FIG. 3 as waveform 33.

The recordable identification marks 8 and permanent information marks 7 of the optical data storage medium 1 are read-out by scanning the annular zone 12, with a focused radiation beam with a wavelength of 405 nm at a numerical aperture (NA) of 0.85 at a scanning velocity of 5.70 m/s. The read-out spot 10 resulting from this radiation beam is drawn in FIG. 2. The spot size is determined by the wavelength λ of the radiation beam and the NA of the focusing objective of the radiation beam and equals 1.22λ/NA=0.58 μm. Thus, the read-out spot 10 of the Optical Pick-up Unit (OPU) of the optical drive has about the same diameter as the tangential length of the pits 9, which have a minimal size of about 0.6 μm. The reflected light from the focused radiation beam is intercepted with an optical detector, which is already present in the optical drive for writing and reading the user data. In FIG. 3 the reflection differences between the first optical reflectivity $r_1$ and the second optical reflectivity $r_2$ of the permanent information mark 7 are shown in the form of a first alternating electrical signal 32 as a function of time. Furthermore the reflection differences between the first optical reflectivity $r_1$ and the third optical reflectivity $r_3$ of the recordable identification mark 8 are shown in the form of a second alternating electrical signal 33 as a function of time. The length of the bit-cell 31 is indicated in FIG. 3 and is equal for both signals 32 and 33. The first and second alternating electrical signals 32 and 33 are filtered with an electrical low pass band filter F with a cut-off frequency of 2 MHz. This is lower than 4.73 MHz which is the arithmetical product of the spatial frequency of $0.83*10^6$/m of the pits 9 of the permanent information mark 7 and the scanning velocity of 5.7 m/s of the focused radiation beam. Note that other embodiments with other spatial frequencies of the pits 9 and other cutoff frequencies of the filter are feasible without departing from the scope of the invention.

The result of filtering waveforms 32 and 33 is shown at the bottom of FIG. 3 as waveforms 34 and 35 respectively. The amplitude of waveform 34 and 35 is generally not equal.

Alternatively the permanent information mark 7 and recordable identification mark 8 of the optical data storage medium 1 are read-out with a focused radiation beam, which is generated by a Light Emitting Diode (LED) with a wavelength in the range of 660–690 nm. In FIG. 2 the read-out spot 10' obtained with this LED has a diameter, which is substantially larger than the pit size of the pits 9 of the permanent information mark 7. This read-out spot 10' is not drawn to scale and in reality may measure more than several micrometers. The read-out signal generated with this spot 10' has a shape similar to the shape of waveform 34 of FIG. 3. Due to scattering and destructive interference of the LED radiation the reflection $r_2$ is lower than $r_1$. Thus when the large spot 10' is present in the permanent information mark 7 the reflection is lower than when it is present in the blank area, having no pits 9. The relatively large spot 10' size is not able to distinguish the separate pits 9 of the permanent information mark 7. The electrical low pass band filter F of FIG. 3 is no longer required because of this "optical filtering" and may be omitted.

The recordable identification mark 8 is written after first scanning the annular zone 12 with the OPU of the optical drive, as described earlier. Reflection differences between the first optical reflectivity $r_1$ and the second optical reflectivity $r_2$ of the permanent information mark 7 are detected and converted into a first alternating electrical signal 32. The tangential position of the permanent information marks 7 is determined from the first alternating electrical signal 32. The recordable identification marks 8 are written and do not overlap in tangential direction with any of the permanent information marks 7 because the tangential position information of the permanent information marks 7 is used as a reference. A first gap, not drawn, is left between the beginning of the recordable identification mark 8 and the end of the permanent information mark 7 and a second gap 11, shown in FIG. 2, is left between the end of the recordable identification mark 8 and the beginning of the subsequent permanent information mark 7. The gaps are sufficiently large to accommodate for the tangential alignment tolerance that can be obtained by the writing system, i.e. the optical drive and OPU.

A preferred and more economic way of writing the recordable identification mark 8 is using the initializer apparatus during production of the optical data storage medium 1. The initializer apparatus has scanning means for detecting the already present permanent information mark 7. Further the same method is used as described in the previous paragraph. Another advantage is that, contrary to the OPU of an optical drive, the initializer writing beam does not require radial tracking during writing because of its relatively large spot size. Furthermore, the large spot size reduces the time required for writing the recordable identification mark 8. The same writing technique may be employed when the scanning of the optical data storage medium 1 is performed in the initializer apparatus and the writing is performed with the initializer beam.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising", "comprise" or "comprises" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention an optical data storage medium is provided having a hybrid permanent information/recordable identification mark in one annular zone. Thus, less radial space is required than when writing the permanent information mark and recordable identification mark in separate annular zones. Further a method to read the hybrid mark and to write the recordable identification mark is provided.

What is claimed is:

1. An optical data storage medium (1), having an optically readable information layer, with a first optical reflectivity, said layer having an annular zone (12), with an inner periphery (3) and an outer periphery (4), outside the user data recording area (2), said annular zone (12) having at least one first type (5) of sector extending from said inner periphery to said outer periphery provided with a permanent information mark (7), having a second optical reflectivity different from the first optical reflectivity, characterized in that the annular zone (12) has at least one second type (6) of sector extending from said inner periphery to said outer periphery provided with a recordable identification mark (8), having a third optical reflectivity different from the first optical reflectivity; thereby creating a hybrid annular zone (12) containing both the permanent information mark and the recordable identification mark to save radial space, wherein the recordable identification mark (8) has a physical format and a spatial bit-cell (31) density, which are substantially equal to the physical format and the spatial bit-cell (31) density of the permanent information mark (7).

2. An optical data storage medium (1) according to claim 1, wherein the first type (5) and second type (6) of sectors form an alternating sequence in tangential direction.

3. An optical data storage medium (1) according to claim 1, wherein four first type (5) and four second type (6) sectors are present.

4. An optical data storage medium (1) according to claim 1, wherein the permanent information marks (7) and the recordable identification marks (8) comprise marks of the bar-code type.

5. An optical data storage medium (1) according to claim 1, wherein the permanent information mark (7) comprises pluralities of pits (9) in the reflective layer forming substantially an optical phase structure, having said second optical reflectivity.

6. An optical data storage medium (1) according to claim 5, wherein the information layer comprises an alloy of metals being able to switch between a crystalline and an amorphous state, one state having said third optical reflectivity and the other state having the first optical reflectivity and that the recordable identification mark (8) comprises areas having said third optical reflectivity.

7. An optical data storage medium (1) according to claim 1, wherein the recordable identification mark (7) represents information linked to the user data content of said optical data storage medium (1).

8. A method of reading the permanent information mark (7) and recordable identification mark (8) of an optical data storage medium (1) according to claim 6, comprising
scanning the zone (12), with a focused radiation beam at a scanning velocity,
intercepting the reflected light from the focused radiation beam with an optical detector,
detecting reflection differences between the first optical reflectivity and the second optical reflectivity of the permanent information mark (7) and converting these reflectivity differences into a first alternating electrical signal (32),
detecting reflection differences between the first optical reflectivity and the third optical reflectivity of the recordable identification mark and convening these reflectivity differences into a second alternating electrical signal (33),
characterized in that the first and second alternating electrical signals (32, 33) are filtered with an electrical low pass band filter (F) with a cut-off frequency in s-1 which is lower than the arithmetical product of the spatial frequency of the pits (9) of the permanent information mark (7) in m-1 and the scanning velocity of the focused radiation beam in ms-1.

9. A method of reading the permanent information mark (7) and recordable identification mark (8) of an optical data storage medium (1) according to claim 8, wherein the focused radiation beam is generated by a light emitting diode, said focused radiation beam having a read-our spot (10') diameter substantially larger than the pit size of the pits (9) of the permanent information mark (7) and wherein the electrical low pass band filter (F) is omitted.

10. A method of writing a recordable identification mark (8) of an optical data storage medium (1) according to claim 6, comprising
scanning the annular zone (12), with a focused radiation beam,
intercepting the reflected light from the focused radiation beam with an optical detector,
detecting reflection differences between the first optical reflectivity and the second optical reflectivity of the permanent information mark (7) and converting these reflectivity differences into a first alternating electrical signal (32),
determining the tangential position of the permanent information marks (7) from the first alternating electrical signal (32),
characterized in that at least one recordable identification mark (8) is written which does not overlap in tangential direction with any of the permanent information marks (7) by using the tangential position of the permanent information marks (7) as a reference, leaving a lint gap (11) between the beginning of the recordable identification mark (8) and the end of the permanent information mark (7) and leaving a second gap between the end of the recordable identification mark (8) and the beginning of the subsequent permanent information mark (7) where the gaps (11) are sufficiently large to accommodate for the tangential alignment tolerance that can be obtained by the writing system of the recordable identification mark (8).

\* \* \* \* \*